(12) United States Patent
Horan et al.

(10) Patent No.: US 8,996,671 B1
(45) Date of Patent: Mar. 31, 2015

(54) METHOD OF PROVIDING SERVICE-PROVIDER-SPECIFIC SUPPORT LINK DATA TO A CLIENT IN A STORAGE CONTEXT

(75) Inventors: Seth B. Horan, Wrentham, MA (US);
Mark Parenti, Milford, NH (US);
Michael A. Costa, Taunton, MA (US)

(73) Assignee: EMC Corporation, Hopkinton, MA (US)

( * ) Notice: Subject to any disclaimer, the term of this patent is extended or adjusted under 35 U.S.C. 154(b) by 231 days.

(21) Appl. No.: 13/435,737

(22) Filed: Mar. 30, 2012

(51) Int. Cl.
*H04L 29/06* (2006.01)
*H04L 12/54* (2013.01)

(52) U.S. Cl.
CPC .................................... *H04L 12/569* (2013.01)
USPC ........................................................... 709/223

(58) Field of Classification Search
CPC ..................... H04L 41/0213; H04L 29/08072; H04L 29/06; H04L 41/22
USPC ........................................................... 709/223
See application file for complete search history.

(56) References Cited

U.S. PATENT DOCUMENTS

| | | | |
|---|---|---|---|
| 7,523,231 B1 | 4/2009 | Gupta et al. | |
| 7,634,567 B1 | 12/2009 | Wood et al. | |
| 7,860,898 B1 | 12/2010 | Moranto et al. | |
| 8,150,877 B1 | 4/2012 | Wood et al. | |
| 8,161,083 B1 | 4/2012 | Wood et al. | |
| 8,302,201 B1 | 10/2012 | Gupta et al. | |
| 8,326,794 B1 | 12/2012 | Wood et al. | |
| 8,533,604 B1 | 9/2013 | Parenti et al. | |
| 2002/0103889 A1* | 8/2002 | Markson et al. | 709/223 |

* cited by examiner

*Primary Examiner* — Vivek Srivastava
*Assistant Examiner* — Sibte Bukhari
(74) *Attorney, Agent, or Firm* — BainwoodHuang (57) ABSTRACT

A method of providing service-provider-specific link data to a client computer includes (a) at a storage management server (SMS), the SMS being configured to provide management services for a data storage system, sending an identification number of the SMS to a database application, (b) at the SMS, receiving, from the database application, a set of link descriptors, the set of link descriptors identifying a set of link addresses (LAs) to a particular remote storage support server (RMSS) of a plurality of RMSSs, the particular RMSS being associated with the identification number, (c) at the SMS, integrating system-specific status information into the LAs of the set of LAs, thereby generating the service-provider-specific link data, and (d) at the SMS, sending the service-provider-specific link data to the client computer to allow the client computer to display links to a user which allow the user to receive service-provider-specific support services from the service-provider.

14 Claims, 8 Drawing Sheets

METHOD OF PROVIDING SERVICE-PROVIDER-SPECIFIC SUPPORT LINK DATA TO A CLIENT IN A STORAGE CONTEXT

BACKGROUND

Data storage arrays are used to provide large amounts (e.g., 10 terabytes to 10 petabytes) of data storage to enterprises. Examples of such data storage arrays include VNX® and VNXe® brand array produced by the EMC Corp. of Hopkinton, Mass. These data storage arrays typically utilize management software to control and monitor configuration and performance. In some conventional systems, this management software is accessible across a network connection from the data storage array via a web interface. In some conventional systems, this remote management software is able to be used to access on-line support resources provided by the manufacturer. An example of such management software is the Unisphere™ software produced by the EMC Corp.

SUMMARY

Although the above-described conventional systems provide beneficial functionality, it would be desirable to allow resellers and other third-party support providers to provide access to their own on-line support resources through the management software and to allow these on-line support resources to be tightly integrated with the data storage arrays. It would also be desirable to allow the location of on-line support resources to be dynamically determined, allowing support responsibility to easily switch between resellers, third-party support providers, and the manufacturer without the user being aware of these changes.

Therefore, the present disclosure provides techniques for allowing system administrators to access service-provider-specific tightly-integrated support services for data storage arrays in a dynamic fashion. A widely-accessible database correlates individual data storage arrays with the support provider with responsibility for that data storage array, and provides link information to the storage management software to allow the storage management software to direct administrators to the proper on-line support resources with tight integration features.

In one embodiment, a method of providing service-provider-specific link data to a client computer is disclosed. The method includes (a) at a storage management server, the storage management server being configured to provide management services for a data storage system, sending an identification number of the storage management server to a database application, (b) at the storage management server, receiving, from the database application, a set of link descriptors, the set of link descriptors identifying a set of link addresses to a particular remote storage support server of a plurality of remote storage support servers, the particular remote storage support server being associated with the identification number, (c) at the storage management server, integrating system-specific status information into the link addresses of the set of link addresses, thereby generating the service-provider-specific link data, and (d) at the storage management server, sending the service-provider-specific link data to the client computer to allow the client computer to display links to a user which allow the user to receive service-provider-specific support services from the service-provider. A corresponding apparatus is also disclosed.

In one embodiment, a method performed by a computer is disclosed. The method includes (a) receiving over a network connection, from a storage management server, a serial number associated with the storage management server, the storage management server being configured to provide management services for a data storage system, (b) selecting a provider identification from a plurality of provider identifications associated with a plurality of service-providers by looking up the serial number in a first database, (c) identifying a set of link descriptors by looking up the provider identification in a second database, the set of link descriptors identifying a set of link addresses to a particular remote storage support server of a plurality of remote storage support servers, the particular remote storage support server being associated with the serial number, and (d) sending over the network connection, the set of link descriptors to the storage management server.

In one embodiment, a method performed by a client web browser running on a client computer is disclosed. The method includes (a) sending a request to a remote storage management server for service-provider-specific link data associated with the storage management server, the storage management server being configured to provide management services for a data storage system, (b) receiving the service-provider-specific link data from the storage management server, (c) displaying links to a user on a display within a storage management environment interface according to the received service-provider-specific link data, the service-provider-specific link data including a set of link addresses to a particular remote storage support server of a plurality of remote storage support servers, the particular remote storage support server being associated with the storage management server, the set of link addresses identifying system-specific status information of the data storage system, (d) receiving a user click command with respect to a selected link of the displayed links, (e) sending a web request to the particular remote storage support server at a link address of the set of link addresses associated with the selected link, (f) receiving a web response from the particular remote storage support server including support display data, and (g) displaying the received support display data to the user on the display within the storage management environment interface in a seamless manner. A corresponding computer program product is also disclosed.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

The present disclosure provides techniques for allowing system administrators to access service-provider-specific tightly-integrated support services for data storage arrays in a dynamic fashion. A widely-accessible database correlates individual data storage arrays with the support provider with responsibility for that data storage array, and provides link information to the storage management software to allow the storage management software to direct administrators to the proper on-line support resources with tight integration features.

Figure 1:
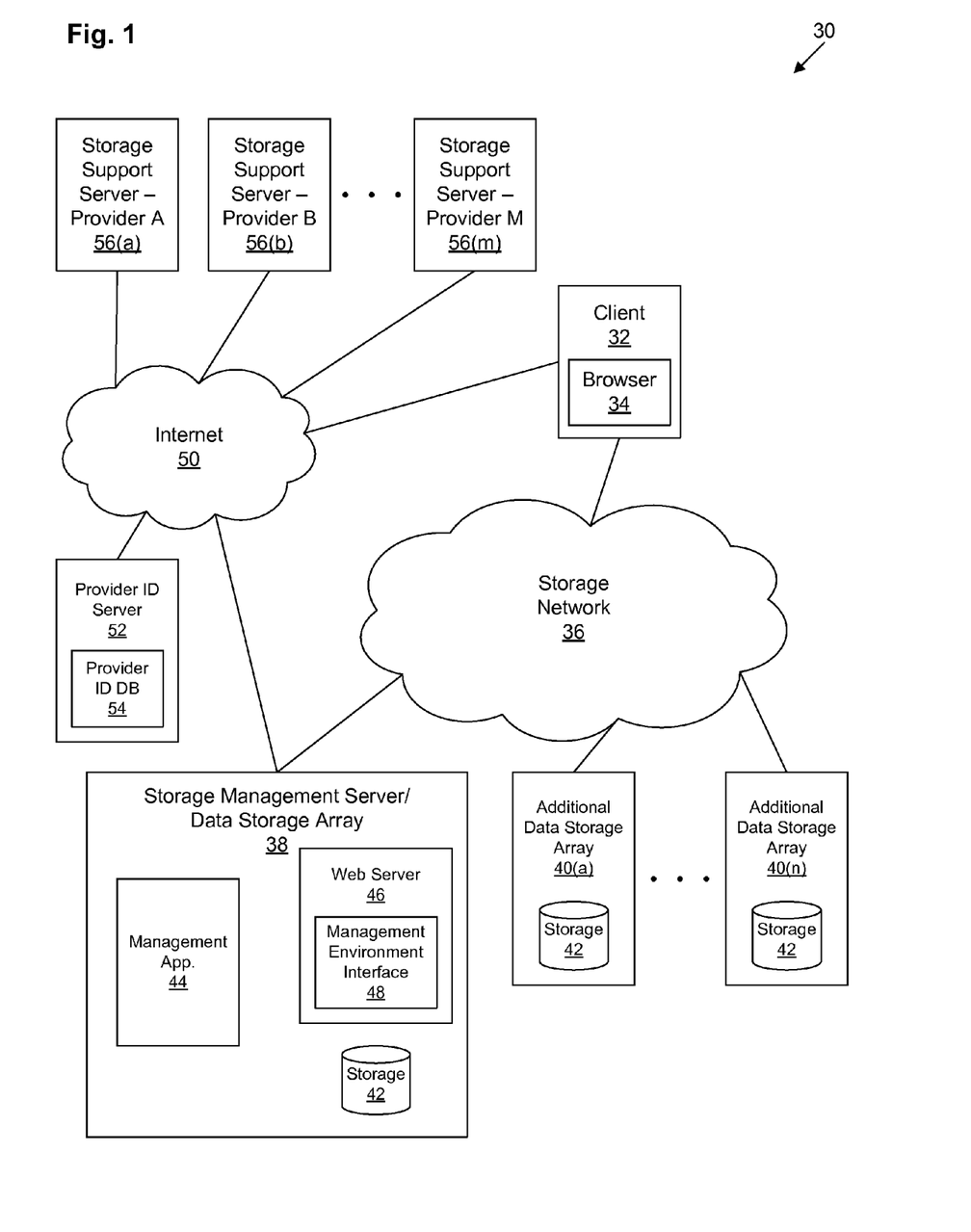
FIG. 1 illustrates an example system for use in practicing various embodiments.

FIG. 1 depicts an example system 30 for use in conjunction with various embodiments. System 30 includes a client machine 32, which runs a browser 34. Client machine 32 may be any kind of computerized device capable of running a web browser, such as, for example, a personal computer, a workstation, a server computer, an enterprise server computer, a desktop computer, a laptop computer, a mobile computing device, a portable computing device, a tablet computing device, a smart phone, etc. Client 32 connects, via a storage network 36, to one or more data storage arrays 38, 40. Storage network 36 may be for example, a storage area network (SAN), a local are network, a wide area network (WAN), a fabric of connections and switches, etc. It may be based on Ethernet, Fibre Channel, etc.

At least one of the data storage arrays 38, 40 also functions as a storage management server 38, which runs a storage management application 44 that provides management services for a data storage system to allow a user, such as a system administrator, to manage the storage array functionality of that storage management server 38, and, in some embodiments also to manage the storage array functionality of additional data storage arrays 40. Each data storage array 38, 40 includes storage 42. Storage 42 is a form of non-volatile memory for storing files and data. Storage 42 may include a plurality of data storage devices (e.g., hard disks, solid state drives, etc.) arranged in an array configuration and controlled by one or more storage processors. Storage management server 38 runs a web server 46, which presents a management environment interface to browser 34 as an interface to the management application 44.

Storage management server 38 and client 32 connect to Internet 50. It should be understood that although the Internet 50 has been depicted, this is by way of example only. Any network could be used for this purpose. In some embodiments, the two networks 36 and 50 may be one and the same. Provider ID server 52 also connects to the Internet 50, allowing storage management server 38 to communicate with provider ID server 52. In some embodiments, provider ID server 52 may connect to storage management server 38 via another network which does not connect to client 32. Provider ID server 52 stores a provider ID database (DB) 54.

Various storage support servers 56 also connect to the Internet 50, allowing client 32 to communicate with the storage support servers 56. As depicted, storage support server 56(a) is under the control of a service provider A, which is responsible for providing support services to certain data storage arrays 38, 40, while storage support server 56(b) is under the control of a service provider B, which is responsible for providing support services to certain other data storage arrays 38, 40. As depicted, there are M storage support servers 56(a-m), each of which is uniquely associated with a different service provider A-M, which are each responsible for providing support services to certain data storage arrays 38, 40. However, in some embodiments, it is possible that several service providers may share a single storage support server 56, and it is also possible that a single service provider may provide service through multiple storage support servers 56.

In some embodiments (not depicted), client 32 may connect to storage management server 38 via a virtualization server and Internet 50, particularly if client 32 is a smart phone or other mobile computing device.

Figure 2:
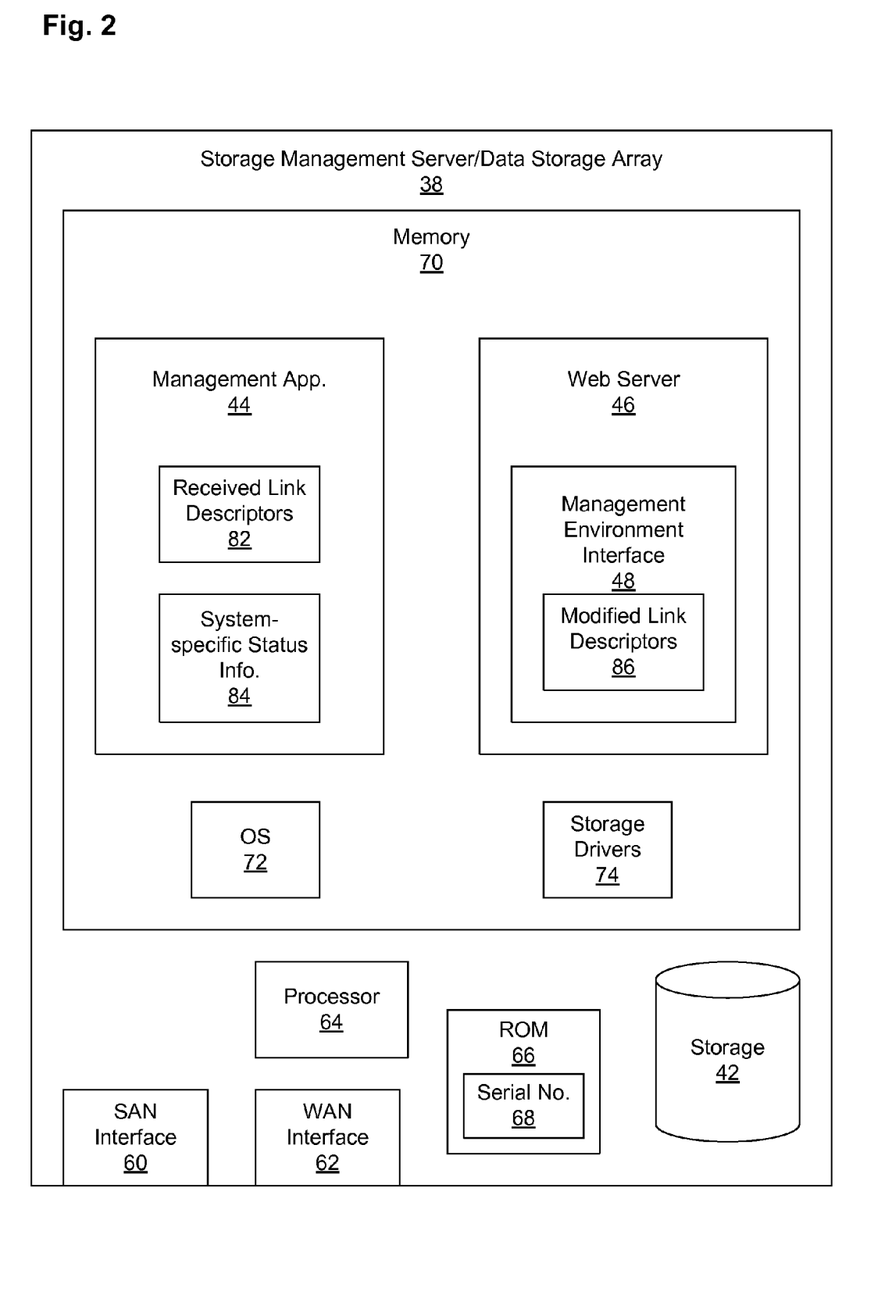
FIG. 2 illustrates an example apparatus according to various embodiments.

FIG. 2 depicts an example storage management server 38 in more detail. Storage management server 38 includes storage 42, a SAN interface 60, a WAN interface 62, a processor 64, a read-only-memory (ROM) 66, and memory 70. SAN interface 60 connects to storage network 36 (e.g., using Ethernet or Fibre Channel), while WAN interface 62 connects to Internet 50. In some embodiments, a LAN interface may substitute for WAN interface 62, allowing the storage management server 38 to connect to the Internet 50 via a router. Processor 64 may be, for example, a central processing unit, a microprocessor, a collection of multiple microprocessors, a digital signal processor, a field-programmable gate array, a collection of circuits configured to perform various operations, or another similar device or set of devices configured to perform operations. ROM 66 is a non-volatile form of memory, which contains data that is typically not changed. It may include a built-in operating system. In some embodiments, ROM 66 may actually be a form of flash ROM, such as electrically erasable programmable read-only memory (EEPROM). ROM 66 stores a serial number 68 which uniquely identifies the data storage array 38. It should be understood that the additional data storage arrays 40 also include ROM 66 storing a unique serial number 68. The serial number 68 is typically programmed into the ROM 66 at the time of system manufacture.

Memory 70 may include, for example, system memory, cache memory, volatile memory, random access memory, some combination thereof, or another similar device or set of devices configured to store running software and or data. Memory 70 stores executing and loaded code as well as associated data during execution by the processor 64, including an operating system 72, storage drivers 74, web server 46, and storage management application 44. Management application 44 runs on processor 64 and in memory 70, and it allows an administrator to control and monitor configuration and performance of the data storage array 38, and, in some embodiments, to control and monitor configuration and performance of additional data storage arrays 40. Management application 44 stores system-specific status information 84 regarding the data storage arrays 38, 40 in memory 70. The system-specific status information 84 includes configuration information, performance data, current state, and error codes associated with the data storage arrays 38, 40. This information may be displayed to, and in some instances, modified by, a system administrator, by way of the web server 46. Web server 46, which also runs on processor 64 and in memory 70, maintains a management environment interface 48, which it transmits to client 32 for display to the administrator, to allow the administrator to view and control storage management application 44. Included within the management environment interface 48 is a support environment interface, which allows the administrator to access support resources maintained by a support provider at a storage support server 56 in connection with the system-specific status information 84, as will be described in further detail, below.

Storage management application 44 also stores a set of received link descriptors 82, which are received from provider ID server 52. In some embodiments, the received set 82 of link descriptors is within a file in markup language format. For example, a file format compatible with the eXtensible Markup Language (XML) format, such as the Web Services Description Language (WSDL) described by the WSDL 2.0 Specification promulgated by the World Wide Web Consortium. Additional detail regarding the set of received link descriptors 82 will be provided below in connection with the corresponding data structure on the provider ID server 52, discussed in the context of FIG. 3. Storage management application 44, among other functions, performs a method as described in FIG. 6.

Management environment interface 48 also stores a set of modified link descriptors 86, which are sent to client 32. In some embodiments, the set of modified link descriptors 86 is within a file in markup language format. For example, a file format compatible with XML format, such as WSDL. Additional detail regarding the set of modified link descriptors 86 will be provided below in connection with the corresponding data structure on the client 32, discussed in the context of FIG. 4.

Figure 3:
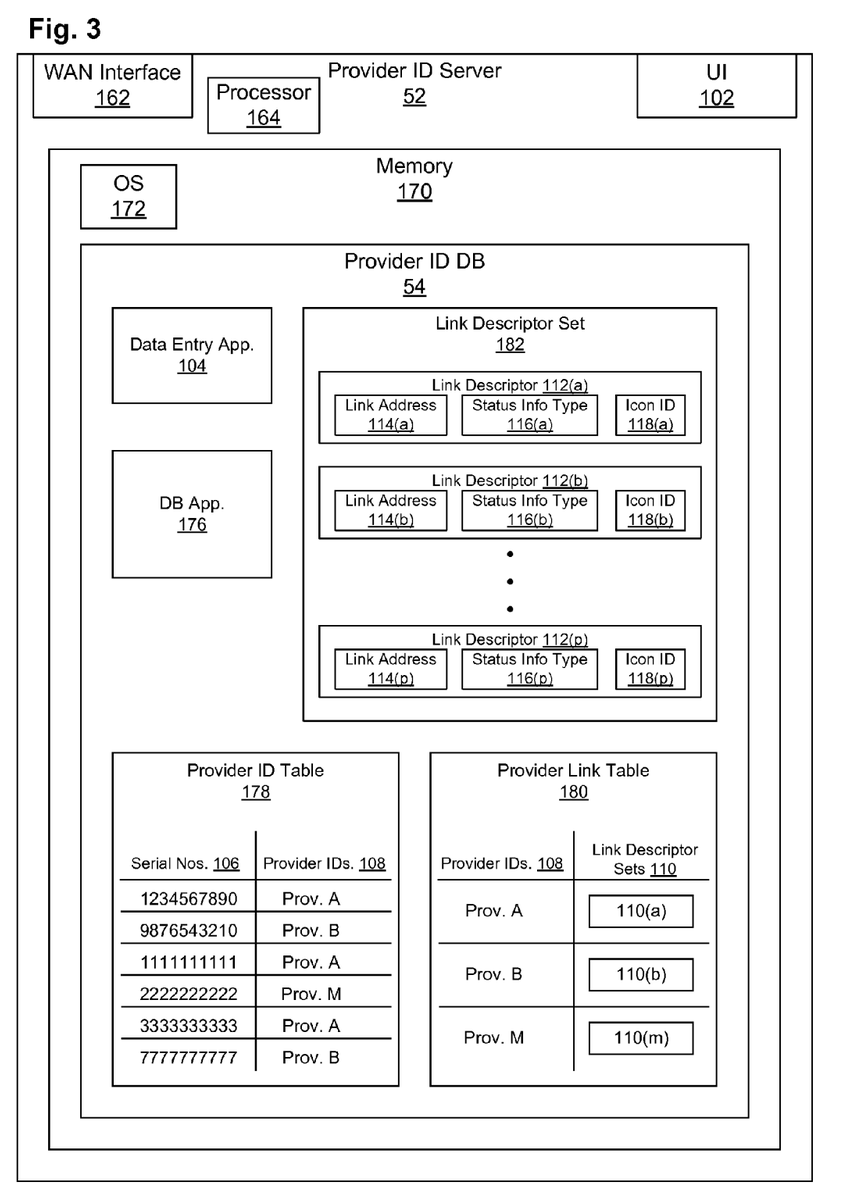
FIG. 3 illustrates an example apparatus for use in practicing various embodiments.

FIG. 3 depicts an example provider ID server 52 in more detail. Provider ID server 52 includes a WAN interface 162, a processor 164, a user interface (UI) 102, and memory 170. WAN interface 162 connects to Internet 50. In some embodiments, a LAN interface may substitute for WAN interface 62, allowing the provider ID server 52 to connect to the Internet 50 via a router. Processor 164 may be, for example, a central processing unit, a microprocessor, a collection of multiple microprocessors, a digital signal processor, a field-programmable gate array, a collection of circuits configured to perform various operations, or another similar device or set of devices configured to perform operations. Provider ID server 52 may also include ROM to store a built-in operating system as well as storage to store data and applications (not depicted). UI 102 connects to one or more UI devices to allow a user to interact with provider ID server 52. UI devices may include, for example, one or more of a display monitor, a touch-sensitive display device, a keyboard, a keypad, a mouse, a tracking pad, a tracking ball, etc., and UI 102 may include, for example, one or more of a display adapter, a serial port, etc.

Memory 170 may include, for example, system memory, cache memory, volatile memory, random access memory, some combination thereof, or another similar device or set of devices configured to store running software and or data. Memory 170 stores executing and loaded code as well as associated data during execution by the processor 164, including an operating system 172, and drivers (not depicted). Memory 170 also stores a provider ID DB 54.

Broadly speaking, provider ID DB 54 stores information that associates particular data storage arrays 38, 40 with particular service providers and that allows links to support services provided by those service providers to be properly formed. Provider ID DB 54 includes various components, including a DB application 176, a data entry application 104, data tables 178, 180, and a link descriptor set 182. In some embodiments, the link descriptor set 182 is within a file in markup language format. For example, a file format compatible with XML format, such as WSDL. A user (e.g., an official employed by one of the support providers) may interact with data entry application 104 via UI 102 in order to enter the appropriate data into tables 178, 180.

Provider ID table 178 maintains a correspondence between serial numbers 106 (or, in some embodiments, other identifying numbers) and provider IDs 108, so that particular data storage arrays 38, 40 can be associated with particular service providers that are responsible (typically by contract) for providing support for the associated data storage arrays 38, 40. For example, provider ID table 178 indicates that data storage arrays 38, 40 having serial numbers 68 equal to 1234567890, 1111111111, and 3333333333 are associated with Provider A, while data storage arrays 38, 40 having serial numbers 68 equal to 9876543210 and 7777777777 are associated with Provider B, and a data storage array 38, 40 having serial number 68 equal to 2222222222 is associated with Provider M.

Provider link table 180 maintains a correspondence between provider IDs 108 and link descriptor sets 110. For example, provider link table 180 indicates that when an administrator accessing data storage arrays 38, 40 associated with Provider A needs support services, link descriptor set 110(*a*) should be used to generate links to the appropriate on-line support resources. Similarly, provider link table 180 indicates that when an administrator accessing data storage arrays 38, 40 associated with Provider B needs support services, link descriptor set 110(*b*) should be used to generate links to the appropriate on-line support resources ands that when an administrator accessing data storage arrays 38, 40 associated with Provider M needs support services, link descriptor set 110(*m*) should be used to generate links to the appropriate on-line support resources. In some embodiments, the link descriptor sets 110 are within files in markup language format. For example, a file format compatible with XML format, such as WSDL.

It should be understood that, in some embodiments, tables 178 and 180 may be combined into a single table or relational database.

Figure 7:
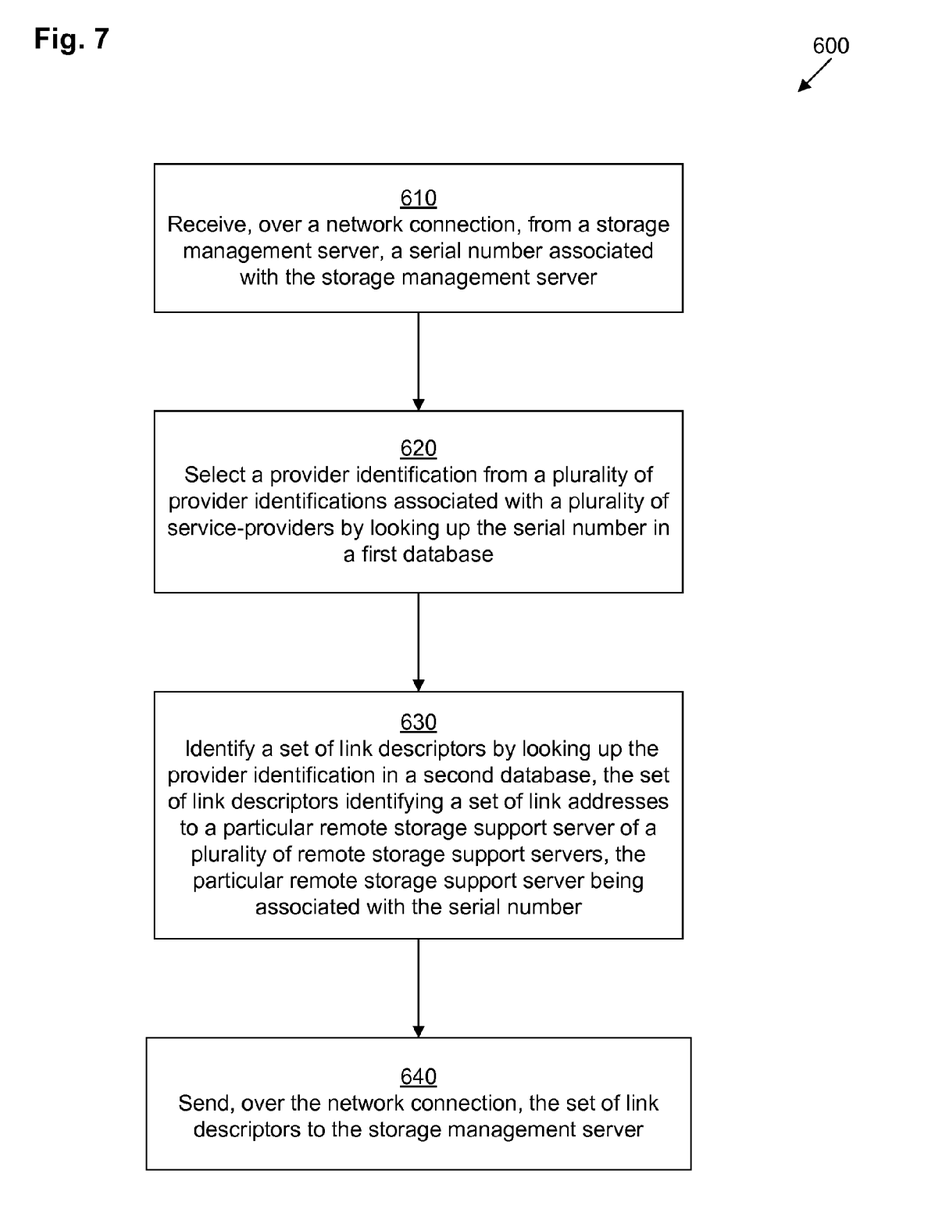
FIG. 7 illustrates an example method according to various embodiments.

DB application 176 performs a method as described in FIG. 7 in order to choose a link descriptor set 110 as link descriptor set 182 and send it to storage management server 38. Link descriptor set 182 includes a set of link descriptors 112, each of which describes a link to a particular on-line support resource associate with a particular service provider. As depicted, link descriptor set 182 includes p link descriptors 112(*a-p*), but it should be understood that the number p of link descriptors 112 may vary between the various link descriptor sets 110, based on the particular on-line support services that each service provider offers. Each link descriptor 112 includes a link address 114, which may be a uniform resource locator (URL) that points to a particular resource on a particular storage support server 56. Each link descriptor 112 also includes a status information type description 116, which describes what particular system-specific status information 84 should be included with a link to the resource described by link address 114 in order to allow for effective integration between the data storage arrays 38, 40 and the on-line support resources. Each link descriptor 112 may also include an icon ID 118 to identify a particular icon to be displayed within the browser 34 on the client 32 in connection with the link. In some embodiments (not depicted), each link descriptor 112 may also store additional information, such as, for example, text to be displayed in browser 34 in connection with the link.

Figure 4:
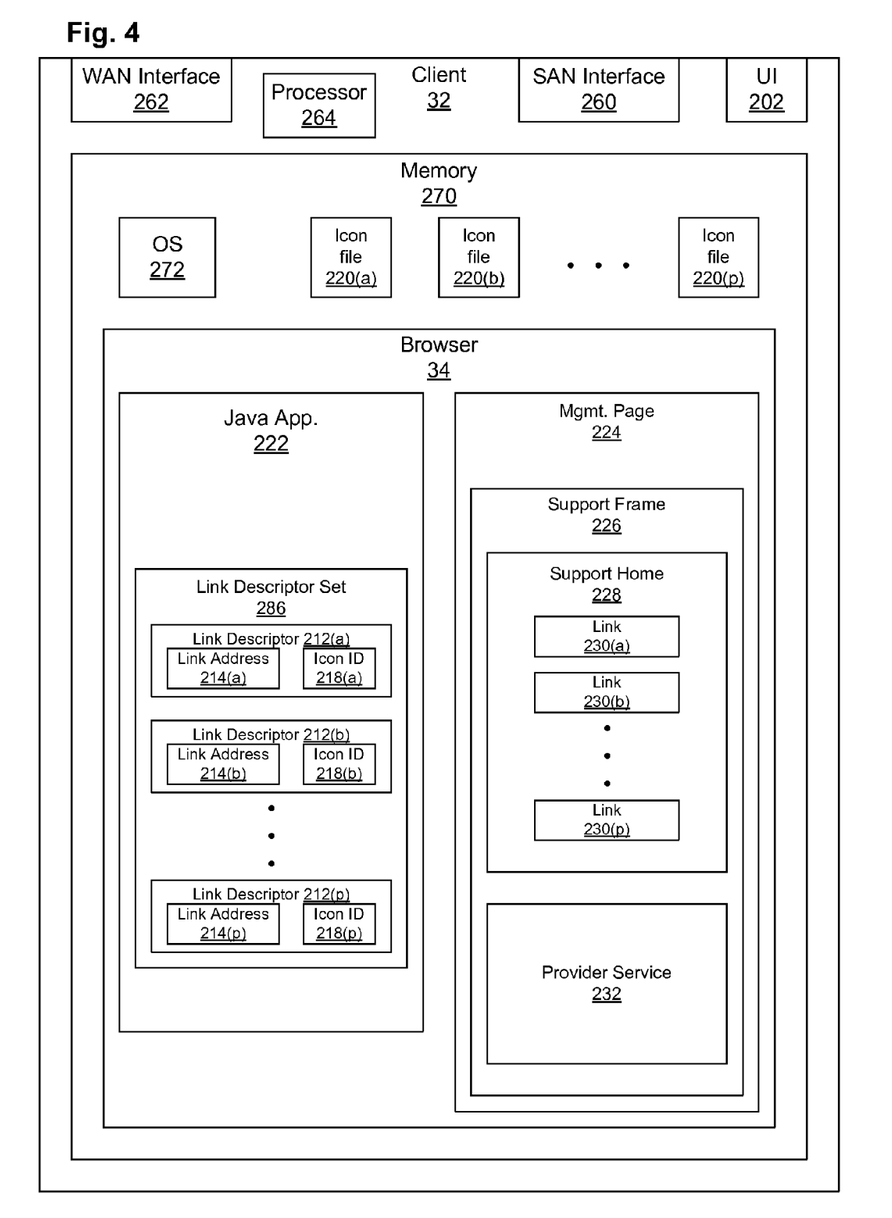
FIG. 4 illustrates an example apparatus for use in practicing various embodiments.

FIG. 4 depicts an example client computer 32 in more detail. Client 32 includes a SAN interface 260, a WAN interface 262, a processor 264, a UI 202, and memory 270. SAN interface 260 connects to storage network 36, and WAN interface 262 connects to Internet 50. In some embodiments, a LAN interface may substitute for WAN interface 262, allowing the client 32 to connect to the Internet 50 via a router. Processor 264 may be, for example, a central processing unit, a microprocessor, a collection of multiple microprocessors, a digital signal processor, a field-programmable gate array, a collection of circuits configured to perform various operations, or another similar device or set of devices configured to perform operations. Client 32 may also include ROM to store a built-in operating system as well as storage to store data and applications (not depicted). UI 202 connects to one or more UI devices to allow a user to interact with client 32. UI devices may include, for example, one or more of a display monitor, a touch-sensitive display device, a keyboard, a keypad, a mouse, a tracking pad, a tracking ball, etc., and UI 202 may include, for example, one or more of a display adapter, a serial port, etc.

Memory 270 may include, for example, system memory, cache memory, volatile memory, random access memory, some combination thereof, or another similar device or set of devices configured to store running software and or data. Memory 270 stores executing and loaded code as well as associated data during execution by the processor 264, including an operating system 272, and drivers (not depicted). Memory 270 also stores a set of icon files 220 and browser 34. Operating within the context of the browser 34 is a Java application 222, which is configured to render a management page 224 (see FIG. 5 for further details) into a form capable of being displayed by browser 34. In the context of rendering a support frame 226 within management page 224, Java application 222 performs a method described below in connection with FIG. 8. In connection therewith, Java application 222 stores a link descriptor set 286 received from storage management server 38, the link descriptor set 286 including a set of link descriptors 212, each link descriptor 212 including a link address 214 and an icon ID 218. Link descriptor set 286 is used, in conjunction with icons 220 to generate a support home 228 version of support frame 226, the support home 228 including links 230 to on-line support resources. When a link 230 is selected by a user (e.g., a system administrator), support frame 226 transitions to displaying a provider service 232 version. In some embodiments, the link descriptor set 286 is within a file in markup language format. For example, a file format compatible with XML format, such as WSDL.

Figure 5:
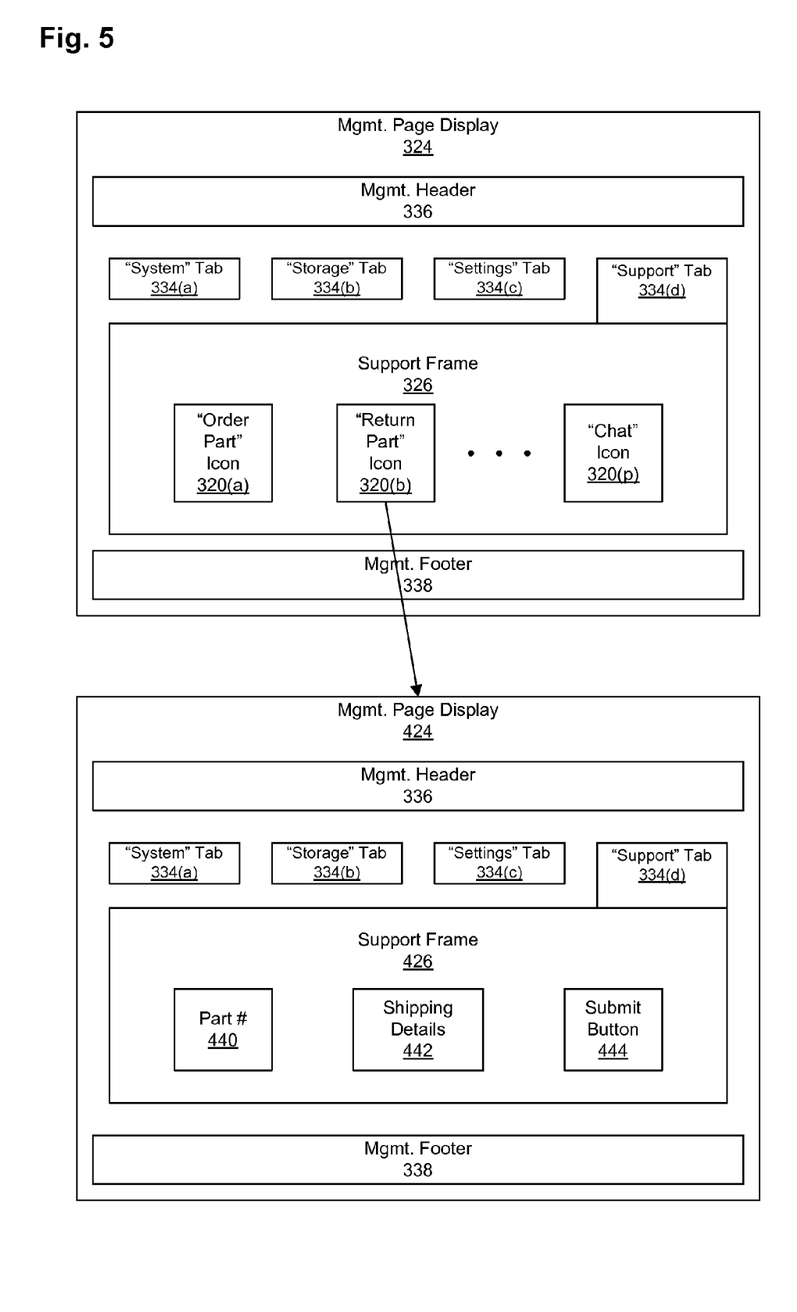
FIG. 5 illustrates example pages rendered by various embodiments.

Operation of the management page 224 can be more easily understood in connection with specific examples of how management page 224 is displayed on a user display. FIG. 5 depicts two example management page displays 324, 424.

Management page display 324 includes a management header 336 and a management footer 338, which provide an integrated user interface experience common to all interactions with the management environment interface 48. For example, management header 336 may indicate the name of the storage management application 44, while management footer 338 may indicate a username of the administrator, a name of the particular data storage array 38, 40 that the storage management application 44 is currently managing, and an amount of time that the administrator has been logged into the storage management application 44. Management page display 324 also includes a set of tabs 334, allowing the administrator to choose between several different management options. For example, the "System" tab 334(a), the "Storage" tab 334(b), and the "Settings" tab 334(c) allow the administrator to view a frame that allows for monitoring or changing system configuration or performance. "Support" tab 334(d) allows the administrator to view support frame 326, which allows for accessing on-line support resources from the appropriate service provider. Upon first selecting "Support" tab 334(d), support frame 326 is displayed in a support home 226 context, displaying a set of links 230 to on-line support resources as a set of icons 320. For example, an "Order Part" icon 320(a) (which allows the administrator to order a part identified by the storage management application 44 as needed for a data storage array 38, 40), a "Return Part" icon 320(b) (which allows the administrator to return a part from a data storage array 38, 40 identified by the storage management application 44 as defective), and a "Chat" icon 320(p) (which allows the administrator to engage in an on-line chat with support personnel from the service provider regarding the state of a data storage array 38, 40 as identified by the storage management application 44) are displayed within support frame 326.

When an administrator clicks on (or otherwise selects) one of the icons 320, support frame 326 is re-rendered to display the corresponding on-line support resource. For example, if the administrator clicks on the "Return Part" icon 320(b), an example revised management page display 424 will be displayed on the user display. Revised management page display 424 includes an identical management header 336, management footer 338 (updated to display up-to-date information), and set of tabs 334, but it has a revised support frame 426, corresponding to provider service 232 version. Since the "Return Part" icon 320(b) was selected, support frame 426 includes content provided by a storage support server 56 regarding returning a defective part. This content may include, for example, a part number 440 identifying which part is defective, shipping details 442 indicating how the administrator can go about shipping the defective part back to the service provider, and a submit button 444, which the administrator can click to formally begin the return process for the identified part. It should be understood that this is by way of example only, and other content may be displayed in the context of returning a defective part, as deemed relevant by the particular support provider. In any case, management page 326 and revised management page 324 appear very similar to the administrator, having a unified graphical interface, such that the administrator may be unaware that the support frame 326 and the revised support frame 426 are hosted by different servers 56 under different control.

Having described the various systems, apparatuses, and associated constructs of and used in conjunction with various embodiments, this Description will now turn to describing various method embodiments which may be performed in conjunction with the above-described systems, apparatuses, and associated constructs.

It should be understood that, within this Description, any time a piece of software is described as executing, running, operating, or performing a method, function, step, operation, etc., the method, function, step, or operation is actually performed by an appropriate processor 64, 164, or 264 while executing code of the software stored in memory 70, 170, or 270.

Figure 6:
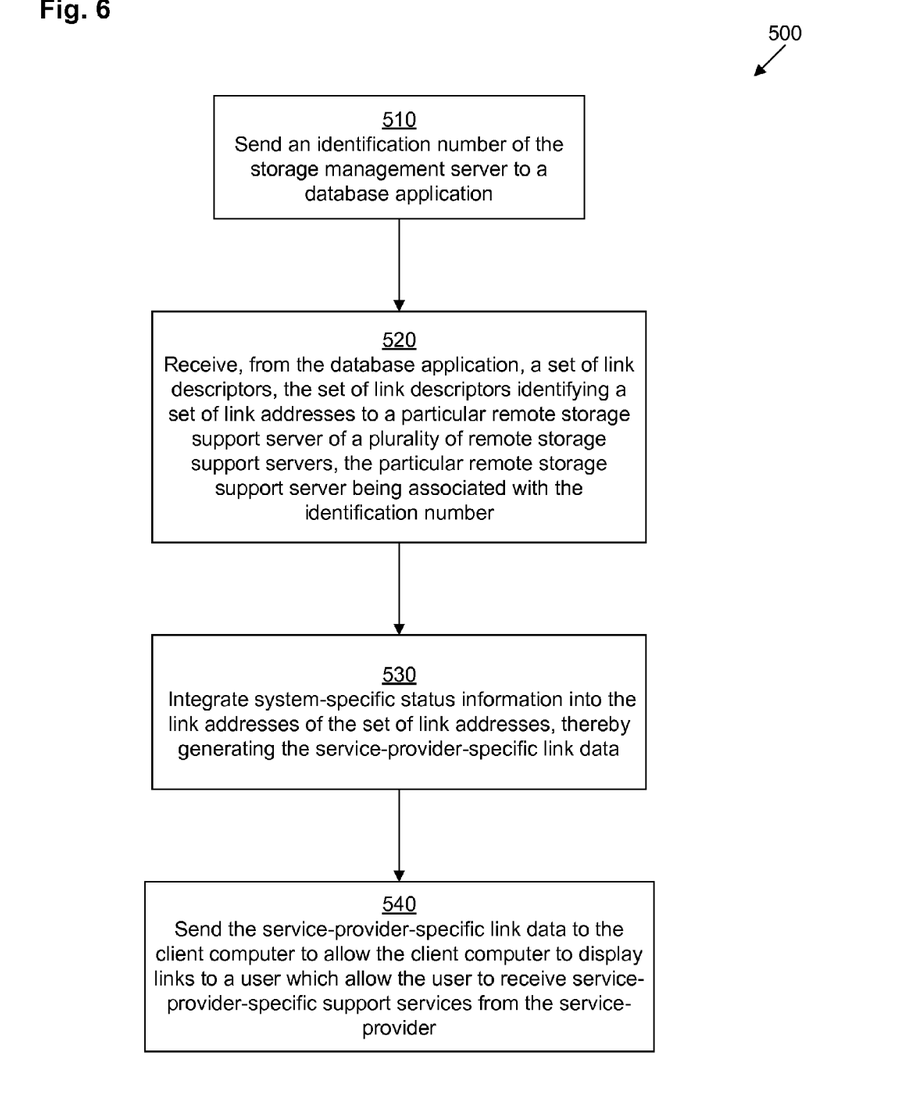
FIG. 6 illustrates an example method according to various embodiments.

FIG. 6 depicts an example method 500 which may be performed by storage management server 38. In some embodiments, method 500 is performed once per login session, while, in other embodiments, it may be performed every time browser 34 requests a support home 228 version of management page 226 e.g., in response to the administrator clicking on the "Support" tab 334(d)). In yet other embodiments, it may be performed more or less frequently. In some embodiments, steps 510-530 are performed only once per session, but step 540 is performed repeatedly every time browser 34 requests a support home 228 version of management page 226.

In step 510, storage management server 38 sends an identification number of the storage management server 38 or a data storage array 40 to a database application 176, e.g., running on remote provider ID server 52. This communication may be, for example, sent over Internet 50 via WAN interface 62. In one embodiment, storage management server 38 sends its serial number 68 stored locally in ROM 66. In another embodiment, storage management server 38 sends a serial number of another data storage array 40 (for example, if storage management server 38 manages multiple data storage arrays 40, which may each be supported by a different service provider). Step 510 is typically performed by storage management application 44. In some embodiments, in addition to sending the identification number, storage management application 44 also sends login credentials for the administrator to verify permission to access the database 54. In some embodiments, these credentials are securely stored within an encrypted file on storage management server 38, the storage management application 44 being authorized to access the encrypted file.

In step 530, storage management server 38 integrates system-specific status information 84 into the link addresses 114 of the set of link addresses, thereby generating service-provider-specific link data. Step 530 is typically performed by storage management application 44. For example, if link address 114(*a*) points to an "Order Part" on-line resource (e.g., with an address <www[dot]provider-X[dot]com/OrderPart.html>) and the corresponding status information type description 116(*a*) indicates that part numbers for all defective parts should be integrated into that address, then storage management application 44 will extract the appropriate defective part numbers from the system-specific status information 84, and create a modified link address and store it in the set of modified link descriptors 86. For example, if two parts (with product numbers 123456 and 654321) are defective, the modified link address might be, using HTML GET, <www[dot]provider-X[dot]com/OrderPart.html?numberofparts=2&part1=123456&part2=654321>. In another embodiment, the modified link address may be a form containing the defective part numbers as data to be sent along with the link address by HTML POST. For example, the modified link address may look something like this:

<FORM ACTION="www[dot]provider-X[dot]com/OrderPart.p1">
      <INPUT TYPE=HIDDEN NAME="numberofparts" VALUE="2"/>
      <INPUT TYPE=HIDDEN NAME="part1" VALUE="123456"/>
      <INPUT TYPE=HIDDEN NAME="part2" VALUE="654321"/>
      <INPUT TYPE=SUBMIT NAME="Order Part(s)">
    </FORM>

However, it should be noted, that in many cases, an icon 320 identified by icon ID 118(*a*) will be used, in which case, a script may be required when using POST.

As an additional example, if link address 114(*b*) points to a "Return Part" on-line resource (e.g., with an address <www[dot]provider-X[dot]com/ReturnPart.html>) and the corresponding status information type description 116(*a*) indicates that part numbers for all defective parts should be integrated into that address, then storage management application 44 will extract the appropriate defective part numbers from the system-specific status information 84, and create a modified link address and store it in the set of modified link descriptors 86. For example, if two parts (with product numbers 123456 and 654321) are defective, the modified link address might be <www[dot]provider-X[dot]com/ReturnPart.html?numberofparts= 2&part1=123456&part2=654321>. In another embodiment, the modified link address may be a form containing the defective part numbers as data to be sent along with the link address by HTML POST, as mentioned above.

As an additional example, if link address 114(*p*) points to a "Chat" on-line resource (e.g., with an address <www[dot]provider-X[dot]com/Chat.html>) and the corresponding status information type description 116(*p*) indicates that all system error data should be integrated into that address, then storage management application 44 will extract the appropriate error data from the system-specific status information 84, and create a modified link address and store it in the set of modified link descriptors 86. For example, if the error data indicates that LUN 7 is offline due to a failure in part number 123456, the modified link address might be <www[dot]provider-X[dot]com/Chat.html?numberoferrorcodes= 2&error1=Offline-LUN7&error2=part-123456>. This allows chat support personnel to chat with the administrator and have easy access to the details of the errors in the system without having to rely on a description provided by the administrator, who may not be an expert. In another embodiment, the modified link address may be a form containing the defective part numbers as data to be sent along with the link address by HTML POST, as mentioned above.

In step 540, storage management server 38 sends the service-provider-specific link data to the client 32 to allow the client 32 to display links 230 to a user which allow the user to receive service-provider-specific support services from the service-provider. Step 540 is typically performed by web server 46. In some embodiments (e.g., when the modified link descriptor set 86 is already loaded in memory 70), step 540 is performed directly in response to the administrator clicking on the "Support" tab 334(*d*), while in other embodiments (e.g., when method 500 itself is performed in response to the administrator clicking on the "Support" tab 334(*d*)), step 540 is performed in response to completion of step 530. In some embodiments, step 540 includes sending the modified link descriptor set 86 to the browser as a WSDL file. In other embodiments (e.g., when client 32 is a smart phone having a basic web browser 34 without Java support), step 540 includes generating management page 224 as an HTML page at the web server 46 using the modified link descriptor set 86, and sending the completed management page 224 to the browser 34. In some embodiments, step 540 may include sending the data or page to a virtualization server to be forwarded to the client 32.

FIG. 7 depicts an example method 600 which may be performed by provider ID server 52. Method 600 may be performed by provider ID server 52 in response to step 510 being performed by storage management server 38.

In step 610, DB application 176 receives, over network interface 162, from storage management server 38, a serial number 68 associated with the storage management server 38. In step 620, DB application 176 selects a provider identification 108 from a plurality of provider identifications associated with a plurality of service-providers by looking up the serial number 68 in a first database, e.g., provider ID table 178. In step 630, DB application 176 identifies a set of link descriptors 110 by looking up the provider identification 108 in a second database, e.g., provider link table 180, thereby extracting a link descriptor set 182. It should be understood that, in some embodiments, such as when tables 178 and 180 are combined into a single database, steps 620 and 630 may be combined. In step 640, DB application 176 sends, over the network interface 162, the link descriptor set 182 to the storage management server 38.

Figure 8:
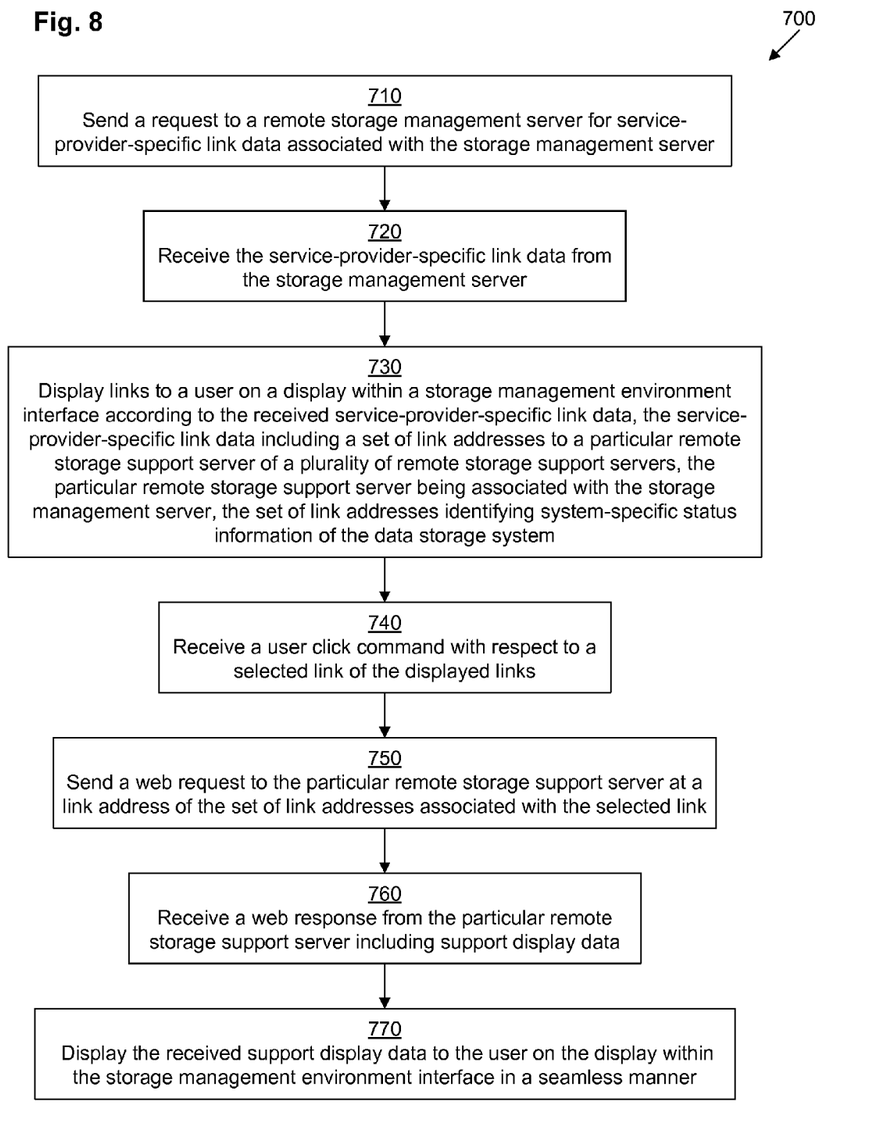
FIG. 8 illustrates an example method according to various embodiments.

FIG. 8 depicts an example method 700 which may be performed by client computer 32. In step 710, browser 34 sends a request to a remote storage management server 38 for service-provider-specific link data associated with the storage management server 38. Step 710 may be performed by browser in response to a user selecting "Support" tab 334(*d*), or it may be performed initially upon the administrator logging in to storage management application 44. In order to load the support frame 326, browser 34 may turn to Java application 222, which sends the query to the storage management application 44 via web server 46. Method 500 (see FIG. 6) may be performed by storage management server 38 in response to step 710.

In step 720, which may be performed in response to step 540 performed by web server 46, browser 34 receives the service-provider-specific link data from the storage management server 38. In one embodiment, the service-provider-specific link data is received in the form of link descriptor set 286 (e.g., in WSDL markup format), which is sent to Java application 222 for processing. In another embodiment, service-provider-specific link data may be received in the form of an HTML page, the links 230 already embodied within the page.

In step 730, browser 34 displays links 230 to a user on a display within a storage management environment interface 48 according to the received service-provider-specific link data. In embodiments in which link descriptor set 286 is received, Java application 222 creates HTML for the support home version 228 of the support frame 226 with reference to the link descriptors 212. For example Java Application 222 parses the WSDL file to extract the link descriptor set 286 and its various components, and then it creates link 230(a) by combining link address 214(a) and icon ID 218(a) (which, may be, for example, an address of icon file 220(a)) in order that browser 34 will display link 230(a) as "Order Part" icon 320(a), which links to an on-line order part resource hosted by a service provider at a storage support server 56, the particular service provider being associated with the storage management server 38. In this example, icon 320(a) is a depiction of icon file 220(a).

In step 740, after displaying the links 230 within page 224, browser 34 receives a user click command with respect to a selected link of the displayed links 230. For example, as depicted in FIG. 5, the user may click on "Return Part" icon 320(b). This may be a click of a mouse while a cursor on a display screen is displayed over icon 320(b), or it may be tap on a touch-sensitive screen over icon 320(b), or it may be a keystroke representing a selection of a link associated with icon 320(b), etc.

In step 750, browser 34 sends a web request to the particular remote storage support server 56 at a link address 214 associated with the selected link 230. Thus, continuing in the example of FIG. 5, after the user clicks icon 320(b), browser 34 sends a web-based request message to the appropriate storage support server 56 to a link address 214(a) such as <www[dot]provider-X[dot]com/ReturnPart.html>, the web-based request message also including system-specific status information 84 which is included within the link address 214(a), either directly within the address, or within POST information included within the web-based request message.

In step 760, browser 34 receives a web response from the particular remote storage support server 56 including support display data. In step 770, browser 34 displays the received support display data to the user on the display within the storage management environment interface 48 in a seamless manner. This may be done by updating management display page 324 to include support frame 426, representing provider service version 232 of support frame 226 received from the storage support server 56, instead of support frame 326, representing the support home 228 version of support frame 226. Thus, the administrator using browser 34 is able to access an on-line resource provided by a particular storage support server 56 associated with the particular storage management server 38 in conjunction with status information 84 associated with the storage management server 38.

While various embodiments of the present disclosure have been particularly shown and described, it will be understood by those skilled in the art that various changes in form and details may be made therein without departing from the spirit and scope of the present disclosure as defined by the appended claims.

For example, although a Java application 222 has been described as operating within browser 34 on client 32, it should be understood that this is by way of example only. Thus, in some embodiments, the application may be written in another language or interpreted by another kind of interpreter, the application being capable of interfacing with browser 34. For example, the application may be a Flex application.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of providing service-provider-specific link data to a client computer, the method comprising:
    at a storage management server, the storage management server being configured to provide management services for a data storage system, sending an identification number of the storage management server to a database application;
    at the storage management server, receiving, from the database application, a set of link descriptors, the set of link descriptors identifying a set of link addresses to a particular remote storage support server of a plurality of remote storage support servers, the particular remote storage support server being associated with the identification number;
    at the storage management server, integrating system-specific status information into the link addresses of the set of link addresses, thereby generating the service-provider-specific link data; and
    at the storage management server, sending the service-provider-specific link data to the client computer to allow the client computer to display links to a user which allow the user to receive service-provider-specific support services from the service-provider;
wherein:
    the database application runs on a server remote from the storage management server, the database application being configured to access a first database and a second database stored on the remote server;
sending the identification number of the storage management server to the database application includes sending the identification number to the database application running on the remote server over a network connection;
receiving the set of link descriptors from the database application includes receiving the set of link descriptors over the network connection from the database application running on the remote server, further including receiving a first file in markup language format, the first file specifying the set of link descriptors, the set of link descriptors corresponding to web-based support services provided by the service-provider, the set of link descriptors also indicating what system-specific status information should be integrated into each link address;
integrating the system-specific status information into the link addresses of the set of link addresses includes modifying the link addresses by including parameters indicative of an error state of the data storage system;
sending the service-provider-specific link data to the client computer includes sending a second file in markup language format to the client computer, the second file specifying the set of link descriptors including the modified set of link addresses;
the client computer is configured to:
parse the second file to extract the set of link descriptors; and
display the links to a user in accordance with respective link descriptors of the set of link descriptors; and
the method further includes:
at the database application running on the remote server, selecting a provider identification from a plurality of provider identifications associated with a plurality of service-providers by looking up the identification number in the first database; and
at the database application running on the remote server, identifying the set of link descriptors by looking up the provider identification in the second database.

2. The method of claim 1 wherein each link descriptor of the set of link descriptors includes a respective icon descriptor identifying an icon to be displayed to the user by the client computer, the icon having a link address specified by the respective link descriptor.

3. An apparatus comprising:
a network interface for communicating with a client computer over a network;
memory; and
a processor, which is configured to cause the apparatus to perform the method of claim 1;
wherein sending the service-provider-specific link data to the client computer includes sending the service-provider-specific link data to the client computer via the network interface.

4. The apparatus of claim 3 wherein:
the apparatus further includes a read-only-memory having a unique serial number encoded therein at manufacture time; and
the identification number of the storage management server is the serial number.

5. The apparatus of claim 3 wherein the data storage system is included within the storage management server.

6. The apparatus of claim 3 wherein the data storage system is a remote data storage system remotely managed by the storage management server.

7. The apparatus of claim 3 wherein:
the database application runs on a server remote from the apparatus; and
the apparatus further includes another network interface for communicating with the server.

8. A method performed by a computer, the method comprising:
receiving over a network connection, from a storage management server, a serial number associated with the storage management server, the storage management server being configured to provide management services for a data storage system;
selecting a provider identification from a plurality of provider identifications associated with a plurality of service-providers by looking up the serial number in a first database;
identifying a set of link descriptors by looking up the provider identification in a second database, the set of link descriptors identifying a set of link addresses to a particular remote storage support server of a plurality of remote storage support servers, the particular remote storage support server being associated with the serial number; and
sending over the network connection, the set of link descriptors to the storage management server;
wherein:
sending the set of link descriptors includes sending a file in markup language format, the file specifying the set of link descriptors, the set of link descriptors corresponding to web-based support services provided by the service-provider, the set of link descriptors also indicating what system-specific status information should be integrated into each link address; and
each link descriptor of the set of link descriptors includes a respective icon descriptor identifying an icon to be displayed to a user, the icon having a link address specified by the respective link descriptor.

9. A method performed by a client web browser running on a client computer, the method comprising:
sending a request to a remote storage management server for service-provider-specific link data associated with the storage management server, the storage management server being configured to provide management services for a data storage system;
receiving the service-provider-specific link data from the storage management server;
displaying links to a user on a display within a storage management environment interface according to the received service-provider-specific link data, the service-provider-specific link data including a set of link addresses to a particular remote storage support server of a plurality of remote storage support servers, the particular remote storage support server being associated with the storage management server, the set of link addresses identifying system-specific status information of the data storage system;
receiving a user click command with respect to a selected link of the displayed links;
sending a web request to the particular remote storage support server at a link address of the set of link addresses associated with the selected link;
receiving a web response from the particular remote storage support server including support display data; and
displaying the received support display data to the user on the display within the storage management environment interface in a seamless manner;

wherein:
receiving the service-provider-specific link data from the storage management server includes receiving a file in markup language format from the storage management server, the file specifying the set of link descriptors; and
displaying the links to the user on the display within the storage management environment interface according to the received service-provider-specific link data includes:
parsing the file to extract the set of link descriptors; and
displaying the links to the user in accordance with respective link descriptors of the set of link descriptors.

10. The method of claim 9 wherein:
each link descriptor of the set of link descriptors includes a respective icon descriptor identifying an icon to be displayed to the user, the icon having a link address specified by the respective link descriptor; and
displaying the links to the user on the display further includes displaying each link by displaying the icon identified by the respective icon descriptor.

11. The method of claim 9 wherein:
the system-specific status information of the data storage system includes an identification of a defective part within the data storage system;
the selected link is a link to a part ordering system;
the link address associated with the link to the part ordering system includes a parameter identifying the defective part;
the support display data received from the particular remote storage support server includes an option to order a replacement part to replace the defective part.

12. The method of claim 9 wherein:
the system-specific status information of the data storage system includes an identification of a defective part within the data storage system;
the selected link is a link to a part return system;
the link address associated with the link to the part return system includes a parameter identifying the defective part;
the support display data received from the particular remote storage support server includes an option to return the defective part.

13. The method of claim 9 wherein:
the system-specific status information of the data storage system includes an identification of errors encountered by the data storage system;
the selected link is a link to an online support chat system;
the link address associated with the link to the online support chat system includes a parameter identifying the errors encountered by the data storage system;
the support display data received from the particular remote storage support server includes a chat window for chatting online with a support representative of the service-provider.

14. A computer program product comprising a non-transitory computer-readable storage medium storing a set of instructions, which, when executed by the computer cause the computer to perform the method performed by the client web browser of claim 9.

* * * * *